US012746685B2

(12) United States Patent
Chen

(10) Patent No.: US 12,746,685 B2
(45) Date of Patent: Sep. 29, 2026

(54) ROBOTIC HANDLING OF AN OPTICAL FIBER AT A FIBER OPTIC PATCH PANEL

(71) Applicant: Nokia Solutions and Networks Oy, Espoo (FI)

(72) Inventor: Haoshuo Chen, Aberdeen, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/883,186

(22) Filed: Sep. 12, 2024

(65) Prior Publication Data

US 2025/0108515 A1 Apr. 3, 2025

Related U.S. Application Data

(60) Provisional application No. 63/587,006, filed on Sep. 29, 2023.

(51) Int. Cl.
*B25J 9/16* (2006.01)
*B25J 19/02* (2006.01)

(52) U.S. Cl.
CPC ............ *B25J 9/1697* (2013.01); *B25J 9/163* (2013.01); *B25J 19/023* (2013.01)

(58) Field of Classification Search
CPC ......... B25J 9/1697; B25J 19/023; B25J 9/163
See application file for complete search history.

(56) References Cited

U.S. PATENT DOCUMENTS

| | | | | |
|---|---|---|---|---|
| 2005/0010499 | A1* | 1/2005 | Farkas | G06Q 10/08 705/28 |
| 2006/0262307 | A1* | 11/2006 | Peupelmann | G01J 4/04 356/364 |
| 2007/0094535 | A1* | 4/2007 | Prasee | H05K 7/1498 714/5.11 |
| 2016/0107312 | A1* | 4/2016 | Morrill | G11B 17/22 700/214 |
| 2017/0334066 | A1* | 11/2017 | Levine | G06V 10/82 |
| 2020/0024853 | A1* | 1/2020 | Furrer | B25J 9/163 |
| 2021/0232154 | A1* | 7/2021 | Kewitsch | B25J 11/005 |

OTHER PUBLICATIONS

Fiber Zone Networks, "FiberZone's AFM Product Line," Automated Fiber Management for Data Centers and Networks, printed on Dec. 3, 2024, 4 pages.

X. Xu, et al., "Automated Fiber Switch with Path Verification Enabled by an AI-Powered Multi-Task Mobile Robot," 49th European Conference on Optical Communications (ECOC 2023), Glasgow, UK, Oct. 1, 2023, 4 pages.

* cited by examiner

*Primary Examiner* — Stephen Holwerda
(74) *Attorney, Agent, or Firm* — Tong, Rea, Bentley & Panagos, LLC

(57) ABSTRACT

A robot comprises an imaging system which generates images of a fiber optic patch panel. The robot further has a robotic arm and a gripper. The arm and the gripper are actuated based on the images to disconnect an optical fiber from an optical port of the fiber optic patch panel, or to connect the optical fiber to the optical port.

17 Claims, 6 Drawing Sheets a) Model architecture for robot-driven event detection model, b) measurement example of Stokes parameters with the YAW-10-5 event and event detection outcome, and c) laboratory map and robot navigation path (inset: the image of the robot at goal location with a stand-by pose).

a) Fiber switch panel image captured by the middl camera with overlays of the object detection results, b) example images from the right and left cameras, c) mode architecture of camera-guided robotic fiber insertion, d) histogram of fiber insertion duration.

a) Model architecture for robot-driven event detection model, b) measurement example of Stokes parameters with the YAW-10-5 event and event detection outcome, and c) laboratory map and robot navigation path (inset: the image of the robot at goal location with a stand-by pose).

ROBOTIC HANDLING OF AN OPTICAL FIBER AT A FIBER OPTIC PATCH PANEL

CROSS-REFERENCE TO RELATED APPLICATIONS

This application claims the benefit of U.S. Provisional Patent Application Ser. No. 63/587,006, filed on Sep. 29, 2023, which is hereby incorporated herein by reference in its entirety.

BACKGROUND

Technical Field

This disclosure relates generally to a fiber optic patch panel, methods for connecting or disconnecting an optical fiber to or from an optical port of the fiber optic patch panel, processing devices for conducting such methods, and a robot for connecting or disconnecting an optical fiber to or from an optical port of a fiber optic patch panel.

Related Art

Leveraging the spatial domain and spatial switching to scale optical network capacity has been extensively researched and many proposals involve active fiber cross connects (FXCs). A fiber-switched node with a large active FXC can use a redundant fabric to avoid a single point of failure (SPOF), which doubles the node cost and increases the insertion loss.

Alternatively, a passive fiber patch panel with automated robotic switching mitigates the need for redundancy and can have lower insertion loss (IL), e.g., less than 1 dB from fiber connectors, while maintaining connectivity with no supplied power.

US 2010/0046885 A1 discloses an automated patch panel. A robotic arm is controlled to change the connection state of an optic patch cord with respect to a port.

SUMMARY OF SOME ILLUSTRATIVE EMBODIMENTS

According to a first aspect of the disclosure, a method comprises: placing a robot in front of a fiber optic patch panel, wherein the robot comprises a robotic arm, a gripper mounted to the robotic arm, and an imaging system; operating the imaging system to generate one or more images of the fiber optic patch panel, and actuating the robotic arm and the gripper based on the one or more images to disconnect an optical fiber from an optical port of the fiber optic patch panel, or to connect the optical fiber to the optical port of the fiber optic patch panel. The one or more images may be images from a stream of images generated by the imaging system.

A marker may be arranged adjacent to the optical port. A marker is a graphic sign that can identify the optical port among other optical ports of the patch panel. The marker can also be used by the robot, or by a processing device controlling the robot, for controlling movement of the robot, especially for actuating the robotic arm or the gripper.

Actuating the robotic arm and the gripper based on the one or more images may comprise feeding the one or more images, or data derived from the one or more images, to a neural network, and actuating the robotic arm and the gripper based on output from the neural network.

The neural network may be trained on multiple training images, at least some of the training images showing an optical fiber connected to an optical port and a marker adjacent to the optical port.

The one or more images of the fiber optic patch panel may include images generated by the imaging system at different angles to the fiber optic patch panel. For example, the images may include a frontal view of the fiber optic patch panel and one or more angled views. This facilitates controlling the movement of the robotic arm.

The robot may comprise a robotic base for displacing the robot. Placing the robot in front of the fiber optic patch panel may comprises: determining a position of the robot and displacing the robot by actuating the robotic base based on the determined position.

According to a second aspect, a method comprises: placing a robot in front of a fiber optic patch panel, wherein the robot comprises a robotic arm and a gripper mounted to the robotic arm; actuating the robotic arm and the gripper to move an optical fiber connected to an optical port of the fiber optic patch panel without disconnecting the optical fiber from the optical port; detecting a change in state of polarization, and in response to detecting the change in state of polarization, actuating the robotic arm to disconnect the optical fiber from the optical port. Moving the optical fiber without unplugging it may comprise moving a portion of the optical fiber in a transverse direction, i.e., in a direction orthogonal to a longitudinal axis of the fiber. Moving the optical fiber without unplugging it can change the state of polarization (SOP) of an optical signal that is propagating through the optical fiber. Detecting the change in SOP indicates that the robot has selected the correct fiber.

The change in state of polarization may be detected by a network infrastructure. The robot may be in wired or wireless communication with the network infrastructure. This allows control of the robot based on detection of the change in SOP.

The method may further comprise, after disconnecting the optical fiber from the optical port: actuating the robotic arm to connect the optical fiber to another optical port of the fiber optic patch panel; actuating the robotic arm to move the optical fiber without disconnecting the optical fiber from the other optical port; failing to detect a change in state of polarization; and in response to failing to detect the change in state of polarization, actuating the robotic arm to disconnect the optical fiber from the optical port. Failure to detect the change in SOP indicates that the other optical port is not the intended optical port. The fiber manipulated by the robot may be called a first fiber. The SOP can be monitored at a second fiber connected to the intended optical port, e.g., an outgoing fiber. Failure to detect a change in SOP at the second fiber indicates that the first fiber is not connected to the intended optical port.

According to a third aspect, a processing device is connected or connectable to a robot by wired or wireless connection, or integrated in or partly integrated in the robot. The processing device is configured to: receive one or more images of a fiber optic patch panel from an imaging system of the robot, and actuate a robotic arm and a gripper of the robot based on the one or more images, to disconnect an optical fiber from an optical port of the fiber optic patch panel, or to connect the optical fiber to the optical port of the fiber optic patch panel.

The processing device may comprise a neural network configured to receive the one or more images or data derived from the one or more images, and the processing device may be configured to actuate the robotic arm and the gripper based on output from the neural network.

The neural network may be trained on multiple training images, at least some of the training images showing an optical fiber connected to an optical port and a marker adjacent to the optical port.

The processing device may be configured to: actuate the robotic arm to move the optical fiber without disconnecting the optical fiber from the optical port; detect a change in state of polarization in an optical signal transmitted through the optical fiber, and in response to detecting the change in state of polarization, actuate the robotic arm to disconnect the optical fiber from the optical port.

According to a fourth aspect, a processing device is connected or connectable to a robot by wired or wireless connection, or integrated or partly integrated in the robot, wherein the processing device is configured to: actuate a robotic arm and a gripper of the robot to move an optical fiber connected to an optical port of the fiber optic patch panel without disconnecting the optical fiber from the optical port; detect a change in state of polarization in an optical signal transmitted through the optical fiber; and in response to detecting the change in state of polarization, actuate the robotic arm to disconnect the optical fiber from the optical port.

According to a fourth aspect, a robot comprises: a robotic base for displacing the robot, a robotic arm mounted on the robotic base, a gripper mounted on the robotic arm, for gripping an optical fiber, and an imaging system for generating one or more images of a fiber optic patch panel when the robot is placed in front of the fiber optic patch panel, wherein the robot further comprises, or is connectable to, by wired or wireless connection: a processing device configured to actuate the robotic arm and the gripper based on the one or more images to disconnect the optical fiber from an optical port of the fiber optic patch panel, or to connect the optical fiber to the optical port of the fiber optic patch panel.

The gripper may comprise a pincer, for example.

The robotic base may comprise one or more wheels or two or more legs.

The imaging system may comprise two or more cameras which are oriented differently from each other.

According to fifth aspect, a fiber optic patch panel comprises a set of optical ports and a set of markers, each respective optical port in the set of optical ports having a marker in the set of markers arranged adjacent to the respective optical port, wherein the markers are identical in size and in outer shape.

Each marker in the set of markers may comprise a solid contour, the solid contour defining the outer shape of the marker. This helps to control movement of the robotic arm relative to a marker and thus relative to an optical port near the marker.

Each marker in the set of markers may comprise a pattern that is unique within the set of markers. This allows the processing device to identify each optical port based on the marker adjacent to the optical port.

The markers may be ArUco markers, for example.

The robot can be used for automated optical network operation, notably for connecting optical fibers to a fiber optic patch panel, or for disconnecting optical fibers from the fiber optic patch panel. The robot may comprise a robotic arm on a mobile robotic base. The robot may be controlled by a processing device.

The processing device may be any kind of signal processing device suitable for receiving input signals (e.g., from sensing devices of the robot, and e.g., from a network infrastructure) and for generating electrical, optical, magnetic, or other signals for controlling the robot. The processing device may include, for example, one or more processors or microcontrollers, memory, and a communication interface. The processing device does not need to be localized in space. For example, the processing device may be located partly on the robot and partly on a network infrastructure. For example, the processing device may comprise one or more processors or microcontrollers located on the robot, one or more processors located on the network infrastructure, and a wired or wireless communication interface (e.g., based on Bluetooth®, ZigBee®, Wi-Fi®, or a 3GPP standard such as 4G or 5G) which interconnects the processors or microcontrollers on the robot with the one or more processors located on the network infrastructure.

In an embodiment, the processing device may use artificial intelligence (AI). For example, the processor may include a neural network that has been trained to control the robot, e.g., based on sensing data obtained by the robot in an environment of the robot. The environment of the robot may, for example, be an optical switching center.

In an embodiment, the robot is used for fiber path verification, e.g., prior to disconnecting an optical fiber from an optical port of the patch panel, or after connecting an optical fiber to the patch panel. More specifically, a real-time coherent receiver can be operated to detect robot-driven events before physically disconnecting optical fibers as a precautionary measure to avoid mistakes that could be caused by improper cable labelling or outdated network databases, for example.

In an embodiment, the robot is capable of navigating in an environment of the robot, e.g., in an optical switching center. For example, the robot may be configured to navigate between different network racks and or different rooms, to carry out various network operation tasks.

The robot may be available at any time. Network operation automation using robots can reduce both capital and operational expenditures.

In various Figures, relative dimension(s) of some feature (s) may be exaggerated to more clearly illustrate the feature (s) and/or relation(s) to other feature(s) therein.

In the various Figures, similar reference numbers may be used to indicate similar structures and/or structures with similar functions.

Herein, various embodiments are described more fully by the Figures and the Detailed Description of Illustrative Embodiments. Nevertheless, the inventions may be embodied in various forms and are not limited to the embodiments described in the Figures and the Detailed Description of Illustrative Embodiments.

DETAILED DESCRIPTION OF ILLUSTRATIVE EMBODIMENTS

Figure 1:
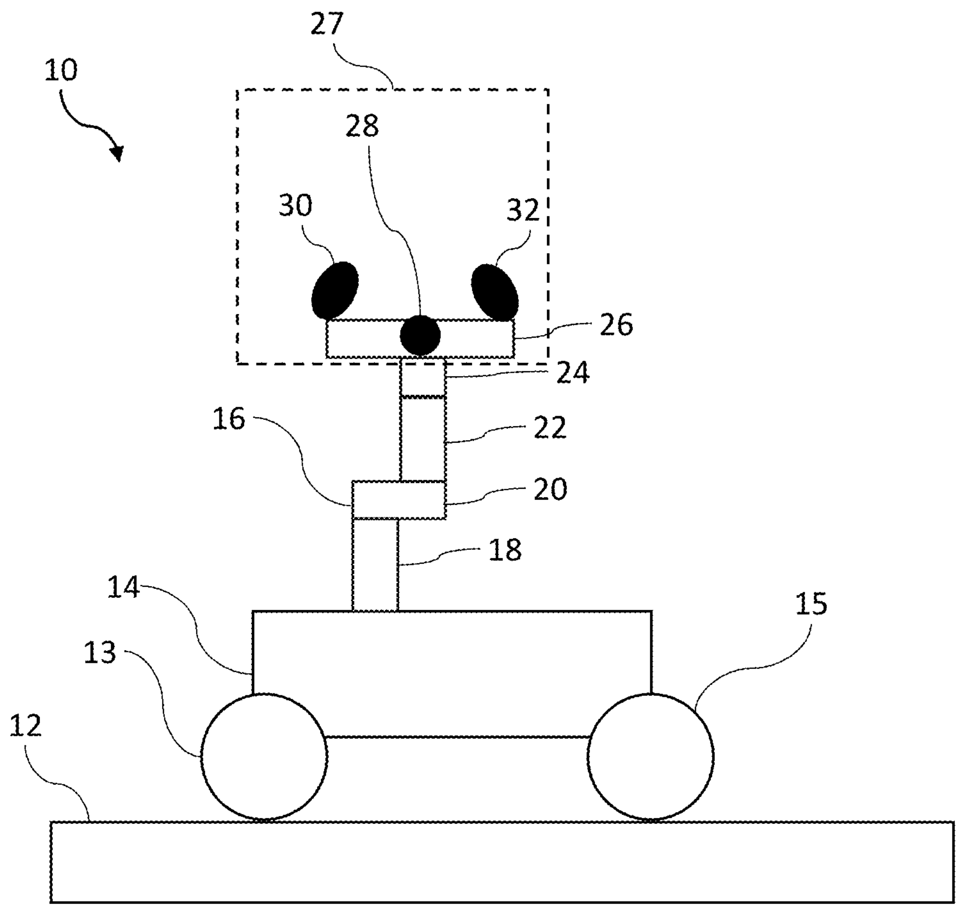
FIG. 1 schematically shows a front view of an example of a robot.

FIG. 1 gives a schematic front view of an example of a robot 10. The robot 10 comprises a robotic base 14, a robotic arm 16, a gripper 24, and an imaging system 27.

The robotic base is movable in an environment of the robot, e.g., in an optical switching center. In the shown example, the robotic base 14 is equipped with wheels 13, 15 for displacing the robot 10 on a ground 12. The ground 12 may be a floor, e.g., in an optical switching center. The robotic base 14 may move freely on the ground, steered by a navigation system (not shown). The navigation system may be located in the robot or it may be distributed across the robot 10 and one or more external apparatuses (not shown), e.g., apparatuses that form part of an optical network infrastructure. In another implementation (not shown), the robotic base 14 is guided mechanically, e.g., by a rail. For localization and mapping of the robot 10, the robotic base 14 may be equipped with a computer, a Wi-Fi router, and a LiDAR sensor. Other configurations for enabling the robot 10 to move in its environment autonomously, semi-autonomously, or in a controlled manner can be implemented.

The robot 10 may be battery-powered, preferably allowing the robot 10 to stand by for several days with a single charge.

The robotic arm 16 is mounted on the robotic base 14. The robotic arm comprises arm segments 18, 20, 22 which are movably interconnected by joints. The robotic arm may be implemented using fewer or more than three segments. For example, the robotic arm may be a 7-degree of freedom (DoF) collaborative robotic arm. The robotic arm can operate alongside a human operator or autonomously from human operators.

Figure 2:
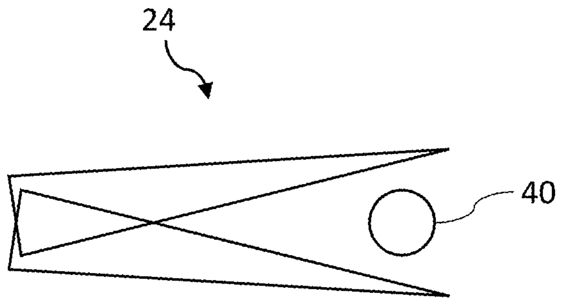
FIG. 2 schematically shows a side view of a gripper for gripping an optical fiber, in an open position.
Figure 3:
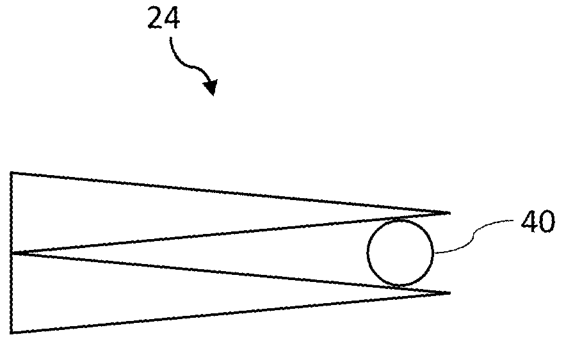
FIG. 3 schematically shows a side view of the gripper in a closed position.

A gripper 24 is mounted to a distal segment (i.e., an end segment) 22 of the robotic arm 16. Schematic side views of the gripper 24 are given in FIGS. 2 and 3, showing the gripper 24 in an open state and in a closed state, respectively. The gripper 24 can be operated to grip and to release an optical fiber 40.

The imaging system 27 may comprise a camera 28. The camera 28 may be positioned closely above the gripper 24. The camera 28 may be a middle camera, and two additional cameras 30 and 32 may be arranged to capture angled images from both the left side and the right side of the gripper 24. The positions and orientations of the cameras 28, 30, 32 are fixed relative to the gripper 24. In the shown example, the cameras 28 are mounted rigidly to the end segment 22 of the robotic arm 16 via a rigid support 26.

The gripper 26 may be a 2-finger gripper (see FIGS. 2 and 3). The gripper 26 is provided for gripping fiber cables, fiber adapters, fiber connectors, and the like.

Figure 4:
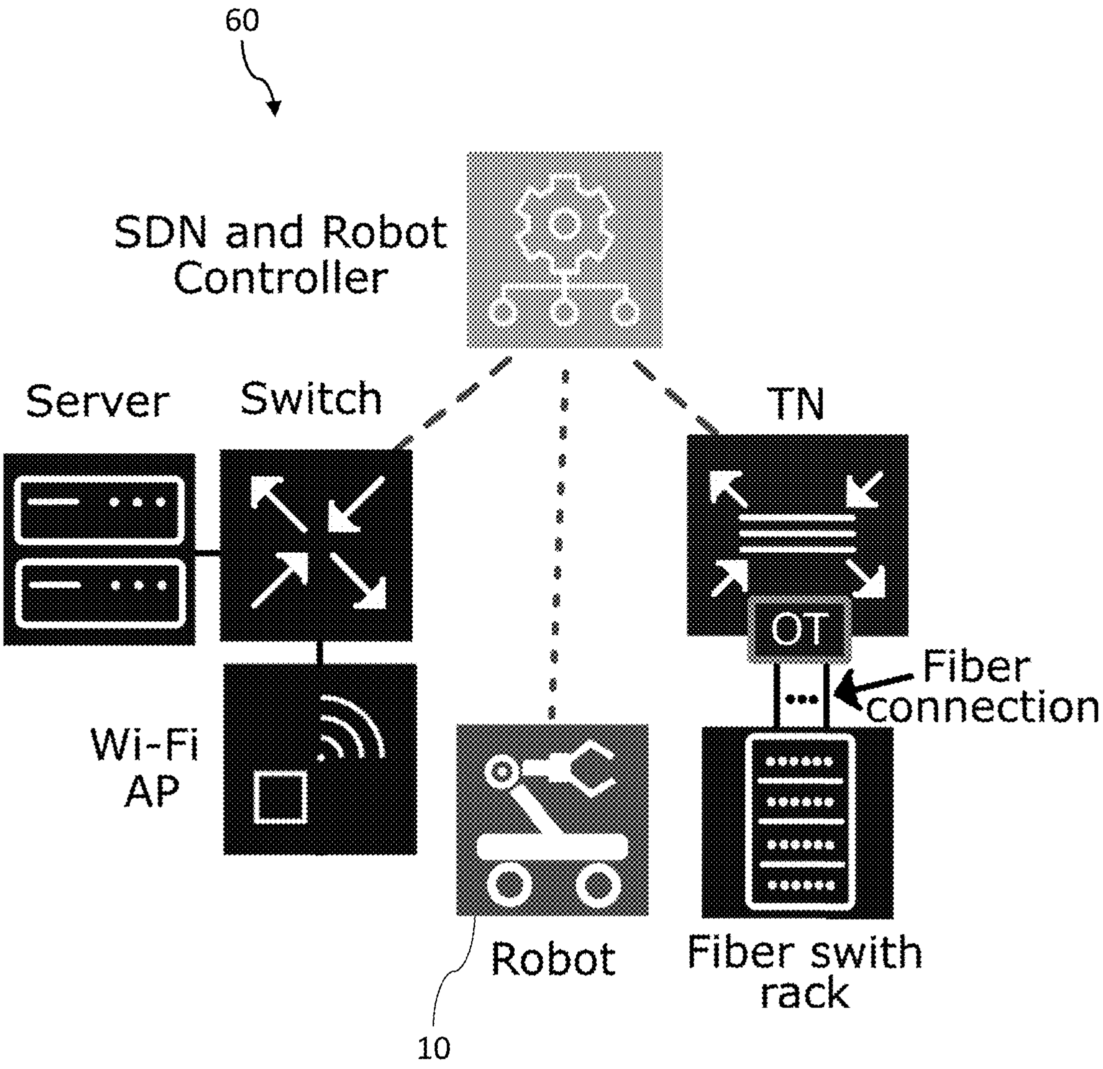
FIG. 4 schematically illustrates an example of operating the robot in an environment, for example, in an optical switching center.

FIG. 4 illustrates, by way of example, the robot 10 and devices connected to the robot 10 (directly or indirectly, by wired or by wireless connection), and devices located in an environment (e.g., an optical switch center) of the robot 10. Any devices which interact to control the robot 10 may be considered a processing device. In the shown example, processing device 60 comprises a Software-defined network (SDN) controller, a server, a switch, and a Wi-Fi access point (AP), plus controllers or other kinds of circuitry located on the robot 10 itself. The server may comprise a graphics processing unit (GPU). To facilitate sensor data publishing and robot control, a Robot Operating System (ROS) may be implemented on the robot 10 and the Software-defined network (SDN) controller. In operation, the robot 10 receives commands from the SDN controller to perform tasks. Artificial intelligence (AI) algorithms process and analyze sensor data gathered by the robot 10 on the server.

The processing device 60 shown in FIG. 4 is merely an example of one possible implementation. Any other kind of localized or distributed processing device suitably configured for controlling the robot 10 by wired or wireless communication can be used. The processing device may include components such as processors, microcontrollers, data buses, and wired or wireless links between such components.

Figure 5:
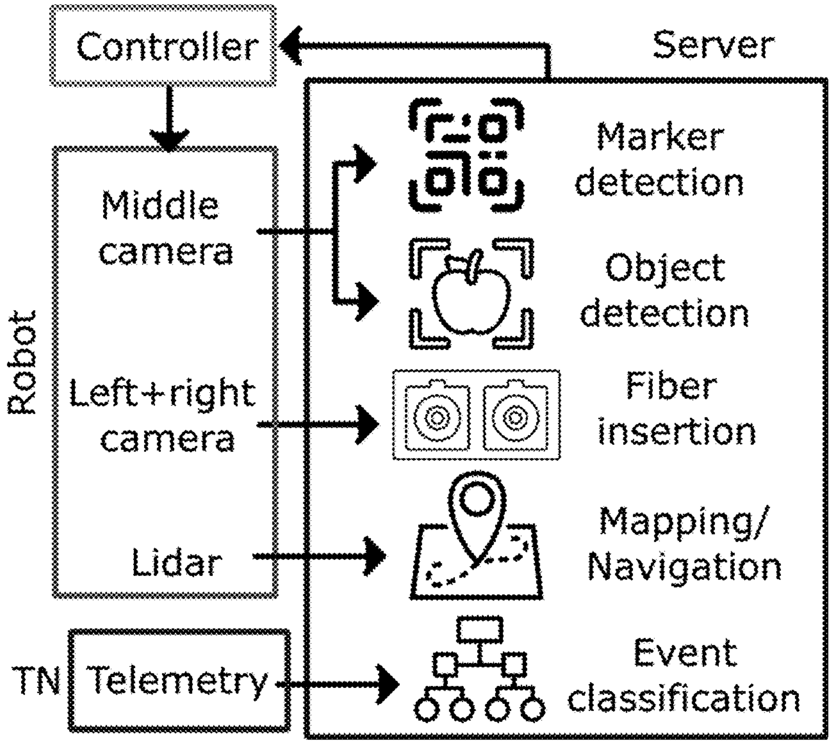
FIG. 5 schematically illustrates an example of a method of operating the robot.

As illustrated schematically in FIG. 5, a software model may be implemented on the server. The model takes images captured by both left and right cameras 30, 32 as input. The model (see additionally FIG. 6, part (c)) may comprise, for example, two 2D convolutional layers with rectified linear Unit (ReLU) and max pooling (MaxPool), a flatten layer, two linear layers with ReLU, and one more linear layer. In addition to five primary actions involving movements of the gripper 24 in the upward, downward, leftward, rightward, and forward directions, the following two additional movements are implemented. A longer forward movement of e.g., 9 mm is designed to facilitate the insertion process in which an optical fiber 40 is inserted into an optical port on the fiber optic patch panel. A backward movement of 2 mm is executed before reinsertion when the model detects an unexpected state, e.g., a large joint torque of the arm.

The model for fiber insertion has been trained on the basis of 802 collected data pairs, each composed of left and right images and an associated action index. All the images were converted to grayscale and resized.

Figure 6:
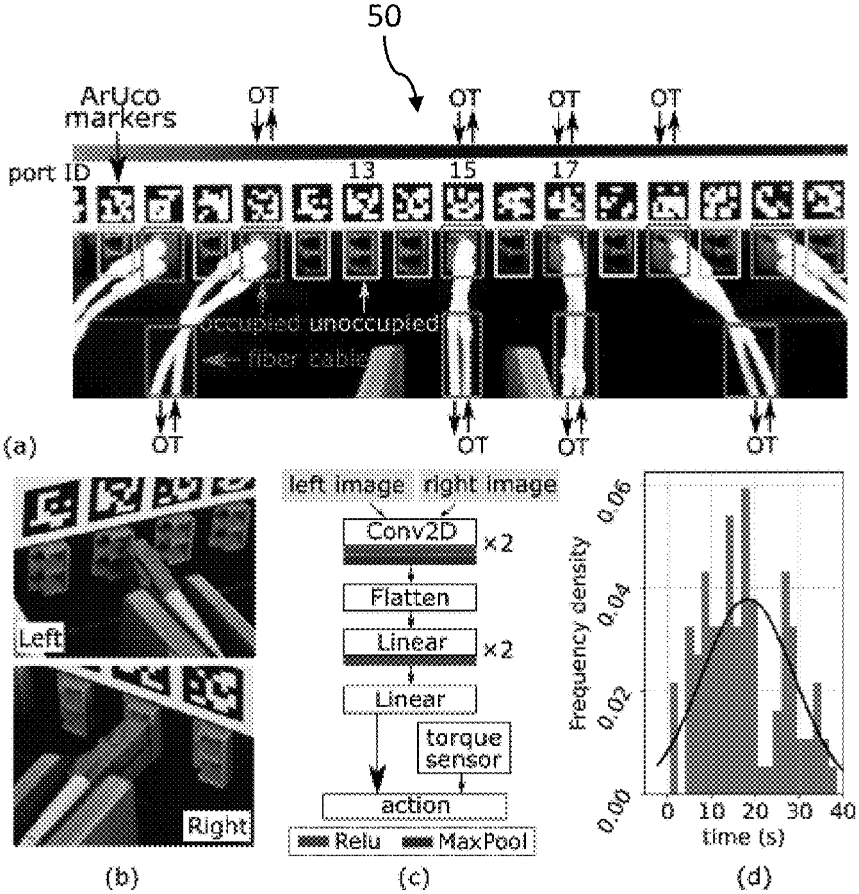
FIG. 6 schematically shows a front view of an example of a fiber optic patch panel. The figure further illustrates robotic fiber insertion.

Part (a) of FIG. 6 shows a front view of a fiber optic patch panel 50. The patch panel 50 comprises a set of optical ports. Optical fibers are inserted in some the optical ports. The robot 10 is configured to position itself in front of the patch panel 50 by movement of the robotic base 14. A processing device controlling the robot further identifies one of the optical port (e.g., port number 11) by matching an identity of a port (e.g., a port scheduled for fiber insertion or fiber removal) with a marker adjacent to the port on the patch panel. Each port on the patch panel may have a unique marker (e.g., an ArUco marker) arranged adjacent to it. This enables a processing device controlling the robot 10 to move the gripper 24 to a selected port by appropriate control of the robotic arm 16. The apparent size of a marker (i.e., size of the marker in an image captured by the imaging system 27) correlates with a distance of the gripper 24 from the optical port while the apparent shape of the marker (i.e., shape of the marker in an image captured by the imaging system 27) correlates with an orientation of the gripper 24 relative to the optical port. The markers can therefore help the processing device in controlling movement of the robotic arm 16.

Robot-driven event detection for path verification is a feature that may be implemented to detect and localize a fiber manipulation event from temporal traces of Stokes parameters measured by an optical transponder (OT). The robot 10 manipulates the fiber before and/or after fiber removal or insertion into the patch panel. Detecting the polarization event in the correct OT verifies that the path is correct for the switching event.

Figure 7:
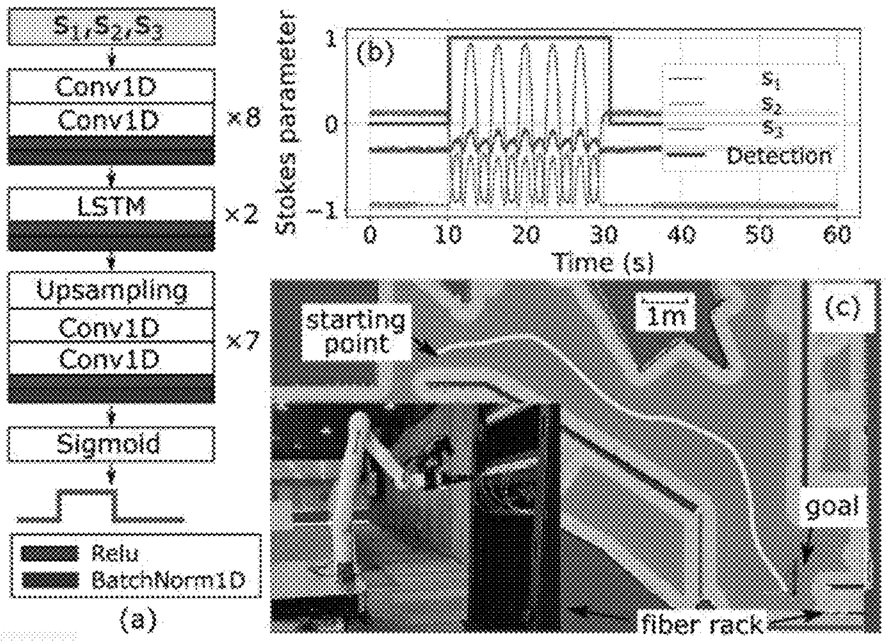
FIG. 7 schematically illustrates an example of a robot-driven event detection model.

FIG. 7 illustrates a model architecture. The model comprises 1D convolutional, long short-term memory (LSTM), upsampling and sigmoid layers together with ReLU and normalization layers. After prediction, each temporal bin is assigned with a binary weight. The event period is localized with a high-level output.

The robot 10 may be programmed, for example, to perform fiber manipulation YAW-10-5 with a duration around of about 22~seconds, during which the gripper loosely grips and swings the fiber cable horizontally with a maximum angle of 10~degrees. The swing repeats for 5 cycles. 120 60-second measurements of the Stokes parameters were captured for training the model.

Half of the measurements include the YAW-10-5 event which occurs at a random start offset within each measurement. The state of the polarization was rescrambled between the measurements.

Part (b) of FIG. 7 shows traces of Stokes parameters of the event and the model output which can accurately verify the fiber path.

It will be understood that the foregoing description of various embodiments has been presented for illustration. This description is not exhaustive and does not limit the claimed invention to the illustrated embodiments. The inventions are intended to include modifications and variations that a person of skill in the art would understand to be possible in light of the above description.

What is claimed is:

1. A method, comprising:

placing a robot in front of a fiber optic patch panel, wherein the robot comprises a robotic arm, a gripper mounted to the robotic arm, and an imaging system, operating the imaging system to generate one or more images of the fiber optic patch panel, actuating the robotic arm and the gripper, based on the one or more images, to move an optical fiber connected to an optical port of the fiber optic patch panel without disconnecting the optical fiber from the optical port, determining, based on the moving of the optical fiber, whether a change in state of polarization in an optical signal transmitted through the optical fiber is detected, and determining, based on whether a change in state of polarization in the optical signal is detected, whether to actuate the robotic arm to disconnect the optical fiber from the optical port.

2. The method of claim 1, wherein a marker is arranged adjacent to the optical port.

3. The method of claim 1, wherein actuating the robotic arm and the gripper based on the one or more images comprises feeding the one or more images, or data derived from the one or more images, to a neural network, and actuating the robotic arm and the gripper based on output from the neural network.

4. The method of claim 3, wherein the neural network has been trained on multiple training images, at least some of the training images showing an optical fiber connected to an optical port and a marker adjacent to the optical port.

5. The method of claim 1, wherein the one or more images of the fiber optic patch panel include images generated by the imaging system at different angles to the fiber optic patch panel.

6. The method of claim 1, wherein the robot comprises a robotic base for displacing the robot, and wherein placing the robot in front of the fiber optic patch panel comprises:

determining a position of the robot and displacing the robot by actuating the robotic base based on the determined position.

7. A method, comprising:

placing a robot in front of a fiber optic patch panel, wherein the robot comprises a robotic arm and a gripper mounted to the robotic arm, actuating the robotic arm and the gripper to move an optical fiber connected to an optical port of the fiber optic patch panel without disconnecting the optical fiber from the optical port, detecting a change in state of polarization, and in response to detecting the change in state of polarization, actuating the robotic arm to disconnect the optical fiber from the optical port.

8. The method of claim 7, wherein the change in state of polarization is detected by a network infrastructure, and wherein the robot is in wired or wireless communication with the network infrastructure.

9. The method of claim 7, further comprising, after disconnecting the optical fiber from the optical port:

actuating the robotic arm to connect the optical fiber to another optical port of the fiber optic patch panel, actuating the robotic arm to move the optical fiber without disconnecting the optical fiber from the other optical port, failing to detect a change in state of polarization, and in response to failing to detect the change in state of polarization, actuating the robotic arm to disconnect the optical fiber from the optical port.

10. A processing device connected or connectable to a robot by wired or wireless connection, or integrated in or partly integrated in the robot, wherein the processing device comprises:

at least one processor; and at least one memory storing instructions which, when executed by the at least one processor, cause the processing device at least to:

receive one or more images of a fiber optic patch panel from an imaging system of the robot, actuate a robotic arm and a gripper of the robot, based on the one or more images, to move an optical fiber connected to an optical port of the fiber optic patch panel without disconnecting the optical fiber from the optical port, determine, based on the moving of the optical fiber, whether a change in state of polarization in an optical signal transmitted through the optical fiber is detected, and determine, based on whether a change in state of polarization in the optical signal is detected, whether to actuate the robotic arm to disconnect the optical fiber from the optical port.

11. The processing device of claim 10, wherein the processing device comprises a neural network configured to receive the one or more images or data derived from the one or more images, and wherein the processing device is configured to actuate the robotic arm and the gripper based on output from the neural network.

12. The processing device of claim 11, wherein the neural network has been trained on multiple training images, at least some of the training images showing an optical fiber connected to an optical port and a marker adjacent to the optical port.

13. The processing device of claim 10, wherein the instructions, when executed by the at least one processor, cause the processing device to:

detect a change in state of polarization in the optical signal transmitted through the optical fiber based on the moving of the optical fiber, and in response to detecting the change in state of polarization in the optical signal transmitted through the optical fiber, actuate the robotic arm to disconnect the optical fiber from the optical port.

14. A processing device connected or connectable to a robot by wired or wireless connection, or integrated or partly integrated in the robot, wherein the processing device comprises:

at least one processor; and at least one memory storing instructions which, when executed by the at least one processor, cause the processing device at least to:

actuate a robotic arm and a gripper of the robot to move an optical fiber connected to an optical port of a fiber optic patch panel without disconnecting the optical fiber from the optical port, detect a change in state of polarization in an optical signal transmitted through the optical fiber, and in response to detecting the change in state of polarization, actuate the robotic arm to disconnect the optical fiber from the optical port.

15. A robot, comprising:

a robotic base for displacing the robot, a robotic arm mounted on the robotic base, a gripper mounted on the robotic arm, for gripping an optical fiber, and an imaging system for generating one or more images of a fiber optic patch panel when the robot is placed in front of the fiber optic patch panel, wherein the robot further comprises, or is connectable to, by wired or wireless connection:

a processing device configured to:

receive one or more images of a fiber optic patch panel from an imaging system of the robot, actuate the robotic arm and the gripper, based on the one or more images, to move the optical fiber without disconnecting the optical fiber from an optical port of the fiber optic patch panel, determine, based on the moving of the optical fiber, whether a change in state of polarization in an optical signal transmitted through the optical fiber is detected, and determine, based on whether a change in state of polarization in the optical signal is detected, whether to actuate the robotic arm to disconnect the optical fiber from the optical port.

16. The robot of claim 15, wherein the robotic base comprises one or more wheels or two or more legs.

17. The robot of claim 15, wherein the imaging system comprises two or more cameras which are oriented differently from each other.

* * * * *